(12) United States Patent  
Christiansen

(10) Patent No.: US 7,286,568 B2  
(45) Date of Patent: Oct. 23, 2007

(54) TECHNIQUES TO GENERATE A CLOCK SIGNAL

(75) Inventor: Ole Christiansen, Alleroed (DK)

(73) Assignee: Intel Corporation, Santa Clara, CA (US)

( * ) Notice: Subject to any disclaimer, the term of this patent is extended or adjusted under 35 U.S.C. 154(b) by 1068 days.

(21) Appl. No.: 10/234,666

(22) Filed: Sep. 3, 2002

(65) Prior Publication Data

US 2004/0042500 A1    Mar. 4, 2004

(51) Int. Cl.
*H04J 3/06*     (2006.01)
(52) U.S. Cl. ...................................... 370/509
(58) Field of Classification Search .................. None
See application file for complete search history.

(56) References Cited

U.S. PATENT DOCUMENTS

| | | | | |
|---|---|---|---|---|
| 3,617,883 A | * | 11/1971 | Richman | 324/76.26 |
| 5,457,717 A | * | 10/1995 | Bellamy | 375/372 |
| 5,497,405 A | | 3/1996 | Elliott et al. | |
| 5,604,773 A | * | 2/1997 | Urala | 375/372 |
| 6,188,685 B1 | | 2/2001 | Wolf et al. | |
| 6,223,219 B1 | | 4/2001 | Uniacke et al. | |
| 6,278,535 B1 | | 8/2001 | Shanton, III | |
| 6,437,892 B1 | * | 8/2002 | Fang et al. | 398/152 |
| 6,647,428 B1 | * | 11/2003 | Bannai et al. | 709/245 |

FOREIGN PATENT DOCUMENTS

EP     0 742 653 A2    11/1996
EP     0 944 290 A2    9/1999

OTHER PUBLICATIONS

Floyd M. Gardner, Ph.D, "Phaselock Techniques" Second Edition, A Wiley-Interscience Publication, John Wiley & Sons, New York, Chichester, Brisbane, Toronto, Singapore, 1 pages which includes cover and pages 206-207.

International Telecommunication Union, ITU-U Telecommunication Standardization Sector of ITU, G.709Y.1331 (Feb. 2001), Series G. Transmission Systems and Media, Digital Systems and Networks, Digital Transmission Systems—Digital Networks—Optical Transport Networks, "Interfaces for the Optical Transport Network (OTN)", pp. 1-85.

Office Action, European Patent Office, Application No. 03 751 978.2-1237, Applicant Intel Corporation, dated Feb. 1, 2006, 5 pages.

Telecommunication Standardization Sector of the International Telecommunication Union (ITU-T), "Network Node Interface for the Synchronous Digital Hierarchy (SDH)", *Series G: Transmission System and Media; Digital Transmission Systems—Terminal Equipments—General*, Document No. G.707, pp. 75-76, Geneva, Switzerland (Mar. 1996).

PCT Written Opinion, date of mailing Sep. 25, 2006, International Application No. PCT/US03/27604, 9 pages.

* cited by examiner

*Primary Examiner*—Huy D. Vu
*Assistant Examiner*—Robert W. Wilson
(74) *Attorney, Agent, or Firm*—Ramin Aghevli; Caven & Aghevli, LLC

(57) ABSTRACT

Techniques to regenerate a data signal for both synchronous and asynchronous modes of transmitting data signals.

18 Claims, 11 Drawing Sheets

| | 15 | 16 | 17 | | | | |
|---|---|---|---|---|---|---|---|
| 1 | RES | JC | | 118 × 16D | ... 1904 | 16FS | 1921 ... 119 × 16D ... 3824 |
| 2 | RES | JC | | 118 × 16D | | 16FS | 119 × 16D |
| 3 | RES | JC | | 118 × 16D | 1905 | 16FS | 119 × 16D |
| 4 | PSI | NJO | PJO | 15D + 117 × 16D | 1920 | 16FS | 119 × 16D T1542790-00 (114739) |

FIG. 2A

TECHNIQUES TO GENERATE A CLOCK SIGNAL

FIELD

The subject matter disclosed herein generally relates to communications systems and more particularly to techniques to regenerate signals.

DESCRIPTION OF THE RELATED ART

In communications systems, devices may be used to moderate traffic of data signals from multiple clock domains. For example, FIG. 1 depicts an example network that includes networks 100 and 110. Data communications link 120 may provide intercommunication between networks 100 and 110. Each of networks 100 and 110 may utilize the same data clock speed but data communications link 120 may operate at a different clock speed. In this example, networks 100 and 110 may utilize Synchronous Optical Network (SONET), and/or Synchronous Digital Hierarchy (SDH) standards whereas data communications link 120 may comply with optical transport network (OTN) described for example in ITU-T G.709/Y. 1331 Interfaces for the optical transport network (OTN) (February 2001).

G.709 describes synchronous and asynchronous modes of transmitting data using an OTN transmission frame. In synchronous mode, the rate of data transfer is an integer multiple of the OTN rate. In asynchronous mode, the rate of data transfer may not be an integer multiple of the OTN rate.

For example, FIG. 2A depicts an example of a G.709 OTN frame structure. The G.709 OTN frame may include 4 rows of 4080 bytes. The first 16 columns may include overhead bytes, and the last 256 columns may include Forward Error Correction (FEC) data. The rest of the frame may hold the payload and/or dummy data.

According to G.709, the OTN frame may include three justification control (JC) bytes, one negative justification opportunity (NJO) byte, and one positive justification opportunity (PJO) byte. According to G.709, in the synchronous case, the PJO byte contains real data, but in the asynchronous case the PJO and NJO may contain real or dummy data. According to G.709 (see for example tables 17-1 to 17-3), an OTN frame receiver may use information in the JC bytes to determine whether to discard or use contents of the PJO and NJO. According to G.709, three justification related operations may be derived: (1) zero, (2) positive (which corresponds to a missing byte per OTN frame), or (3) negative (which corresponds to an extra byte per OTN frame). For negative justification, PJO and NJO may both include real data. For positive justification, PJO and NJO may both include dummy data. For zero justification, PJO may include real data whereas the NJO may include dummy data.

Conventional receivers may use separate dedicated circuitry to regenerate each of synchronous and asynchronous signals. For example, FIG. 2B depicts in block diagram format a clock regenerator for a synchronous signal receiver. The clock regenerator of FIG. 2B may use a fixed frequency clock signal to regenerate received signals. The clock regenerator of FIG. 2B may not be used to regenerate received asynchronous signals due to inability to account for justification.

FIG. 2C depicts an example of a conventional clock regenerator for an asynchronous signal receiver. The asynchronous clock regenerator of FIG. 2C may account for the use of justification. An elastic storage device may store received data and provide the data at the correct average frequency over time. However, the asynchronous clock regenerator of FIG. 2C may not provide data at the correct frequency instantaneously but provide data at the correct frequency on average.

BRIEF DESCRIPTION OF THE DRAWINGS

FIG. 2A depicts an example of a G.709 OTN frame structure.

Note that use of the same reference numbers in different figures indicates the same or like elements.

DETAILED DESCRIPTION

Figure 1:
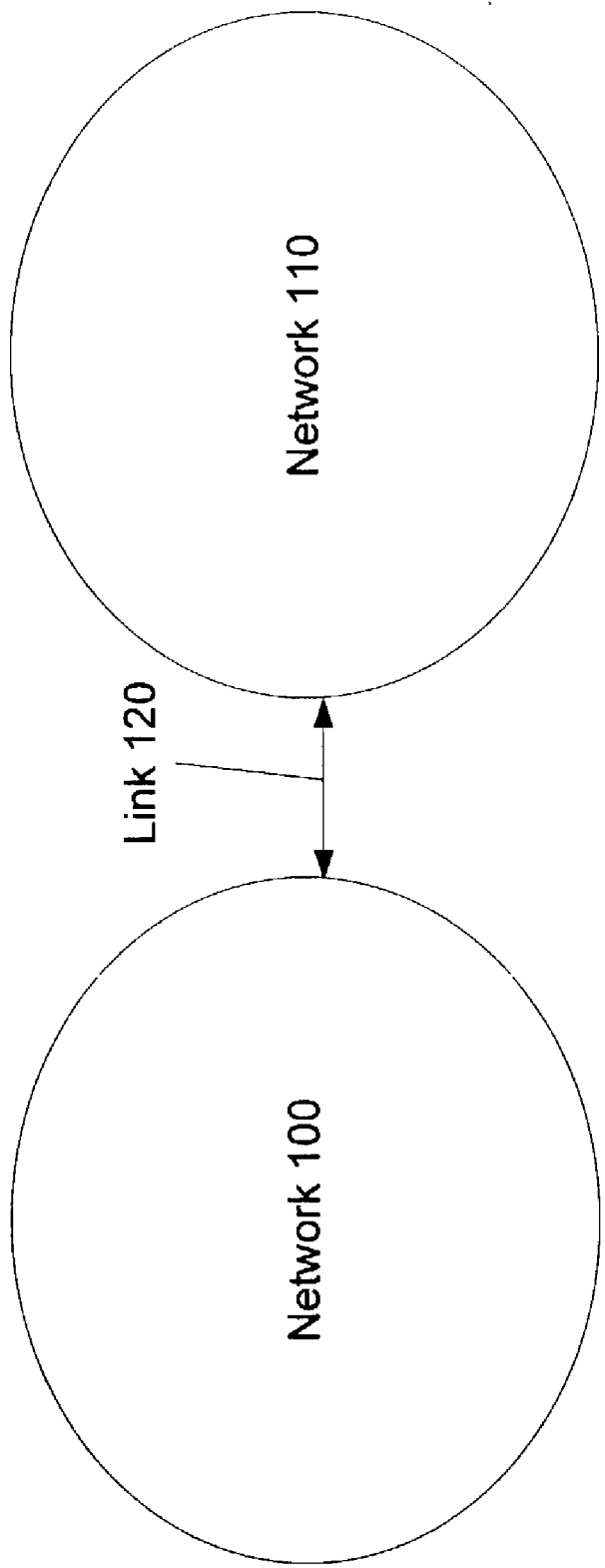
FIG. 1 depicts an example network.
Figure 2B:
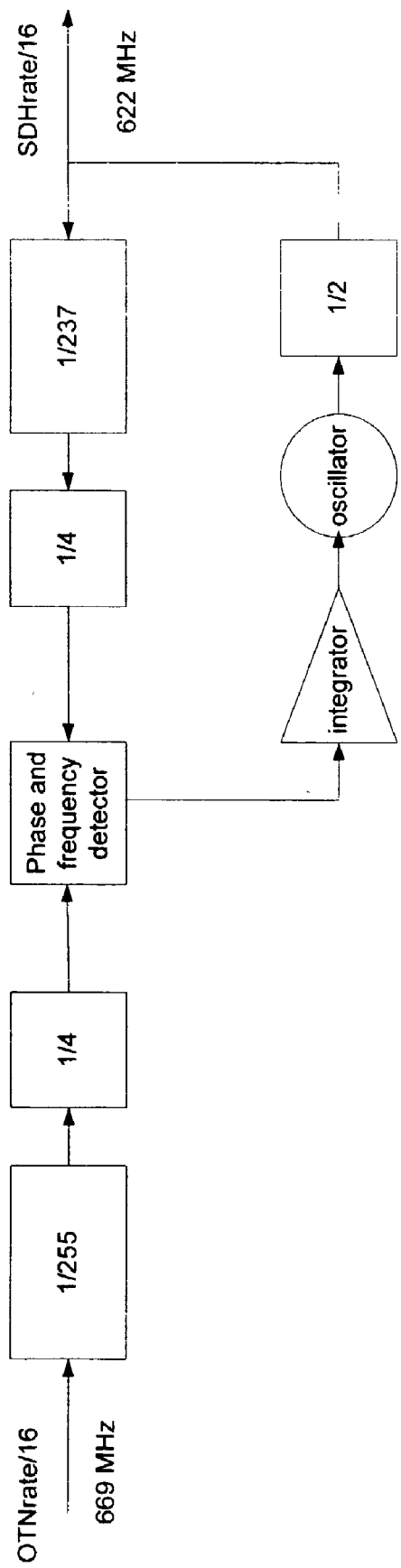
FIG. 2B depicts an example of a synchronous clock regenerator.
Figure 2C:
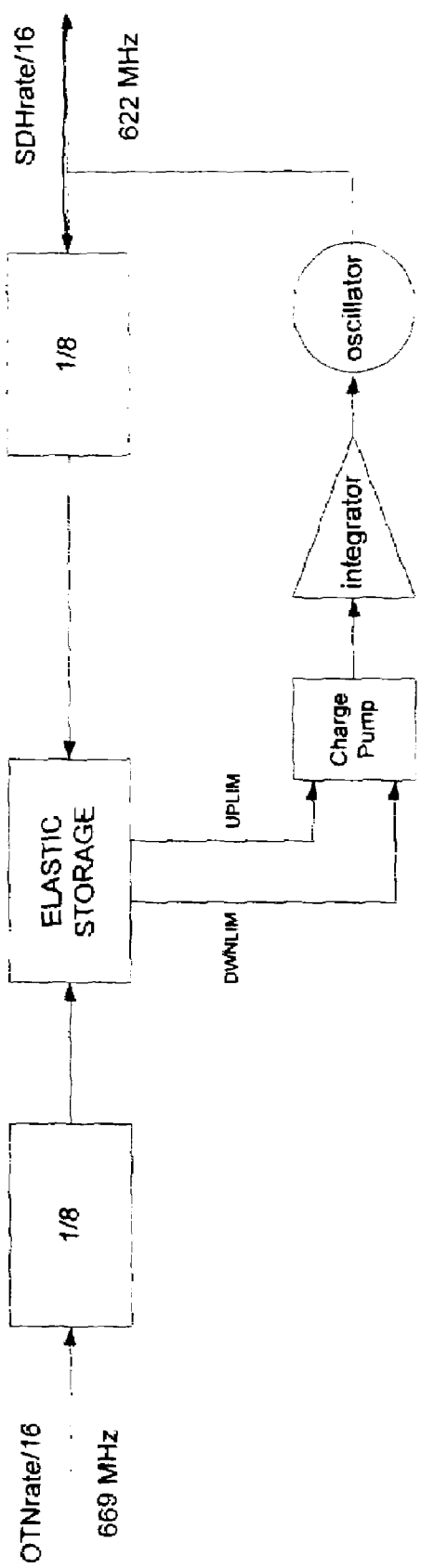
FIG. 2C depicts an example of an asynchronous clock regenerator.
Figure 3:
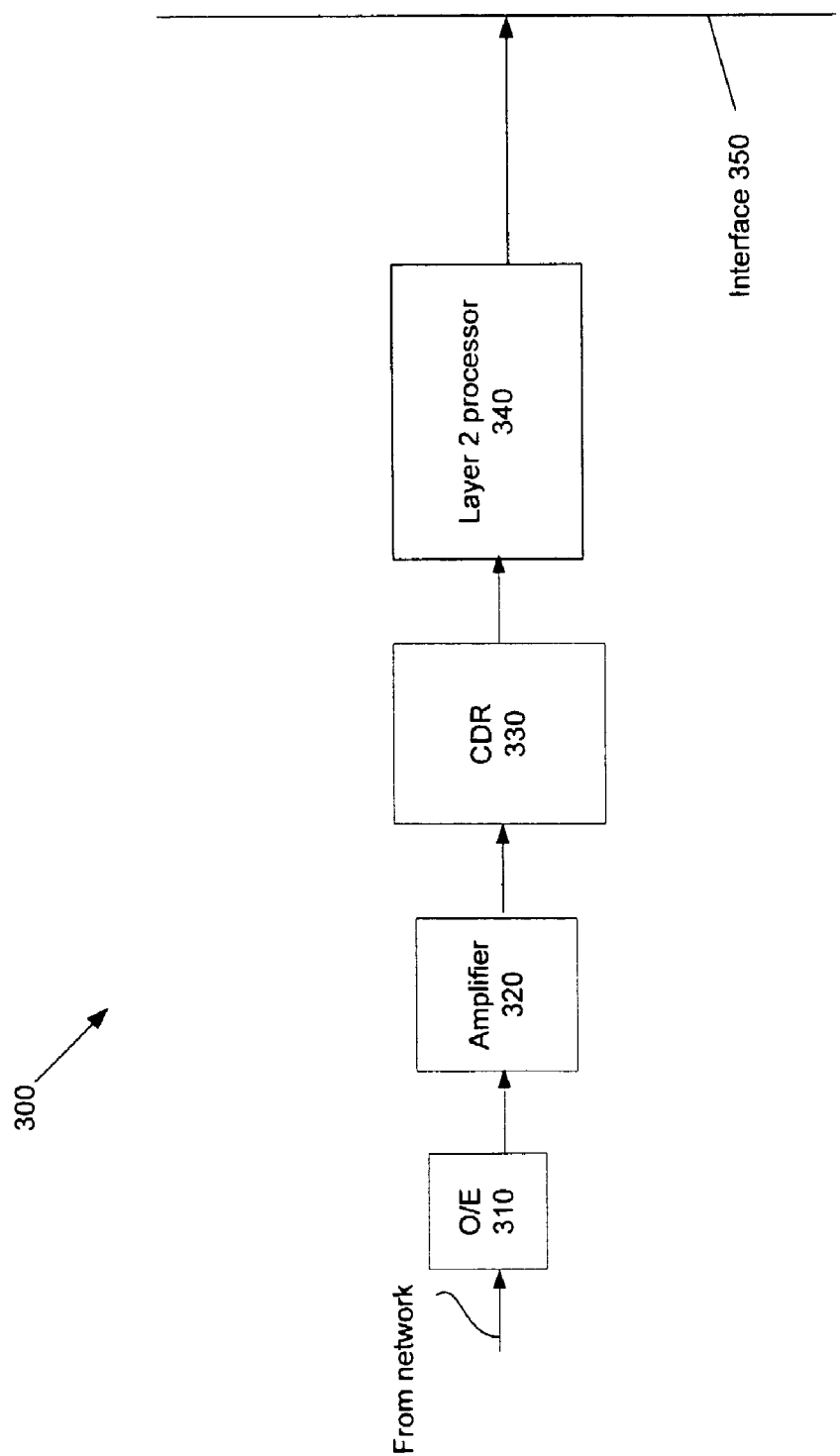
FIG. 3 depicts one possible receiver system in which some embodiments of the present invention may be used.

FIG. 3 depicts one possible receiver system 300 in which some embodiments of the present invention may be used. Receiver 300 may receive signals encoded in compliance for example with optical transport network (OTN), Synchronous Optical Network (SONET), and/or Synchronous Digital Hierarchy (SDH) standards. Example optical networking standards may be described in ITU-T Recommendation G.709 Interfaces for the optical transport network (OTN) (2001); ANSI T1.105, Synchronous Optical Network (SONET) Basic Description Including Multiplex Structures, Rates, and Formats; Bellcore Generic Requirements, GR-253-CORE, Synchronous Optical Network (SONET) Transport Systems: Common Generic Criteria (A Module of TSGR, FR-440), Issue 1, December 1994; ITU Recommendation G.872, Architecture of Optical Transport Networks, 1999; ITU Recommendation G.825, "Control of Jitter and Wander within Digital Networks Based on SDH" March, 1993; ITU Recommendation G.957, "Optical Interfaces for Equipment and Systems Relating to SDH", July, 1995; ITU Recommendation G.958, Digital Line Systems based on SDH for use on Optical Fibre Cables, November, 1994; and/or ITU-T Recommendation G.707, Network Node Interface for the Synchronous Digital Hierarchy (SDH) (1996).

With respect to FIG. 3, optical-to-electrical converter ("O/E") 310 may convert optical signals received from an optical network into electrical signals. Although reference has been made to optical signals, the receiver 300 may, in addition or alternatively, receive electrical signals from an electrical signal network or wireless or wire-line signals according to any standards. Amplifier 320 may amplify the electrical signals. Clock and data recovery unit ("CDR") 330 may regenerate the electrical signals and provide a reference clock signal used to regenerate the electrical signals. On the regenerated signals, layer two processor 340 may perform media access control (MAC) management in compliance for example with Ethernet, described for example in versions of IEEE 802.3; optical transport network (OTN) de-framing and de-wrapping in compliance for example with ITU-T G.709; forward error correction (FEC) processing, in accordance with ITU-T G.975; and/or other layer 2 processing. Some embodiments of the present invention may be used with layer two processor 340. Interface 350 may provide intercommunication between layer two processor 340 and other devices such as a microprocessor, memory devices (not depicted), packet processor (not depicted), and/or a switch fabric (not depicted). Interface 350 may comply, for example, with Peripheral Component Interconnect (PCI), Universal Serial Bus (USB), Ethernet, IEEE 1394, and/or a vendor specific multi-source agreement (MSA) protocol.

Figure 4:
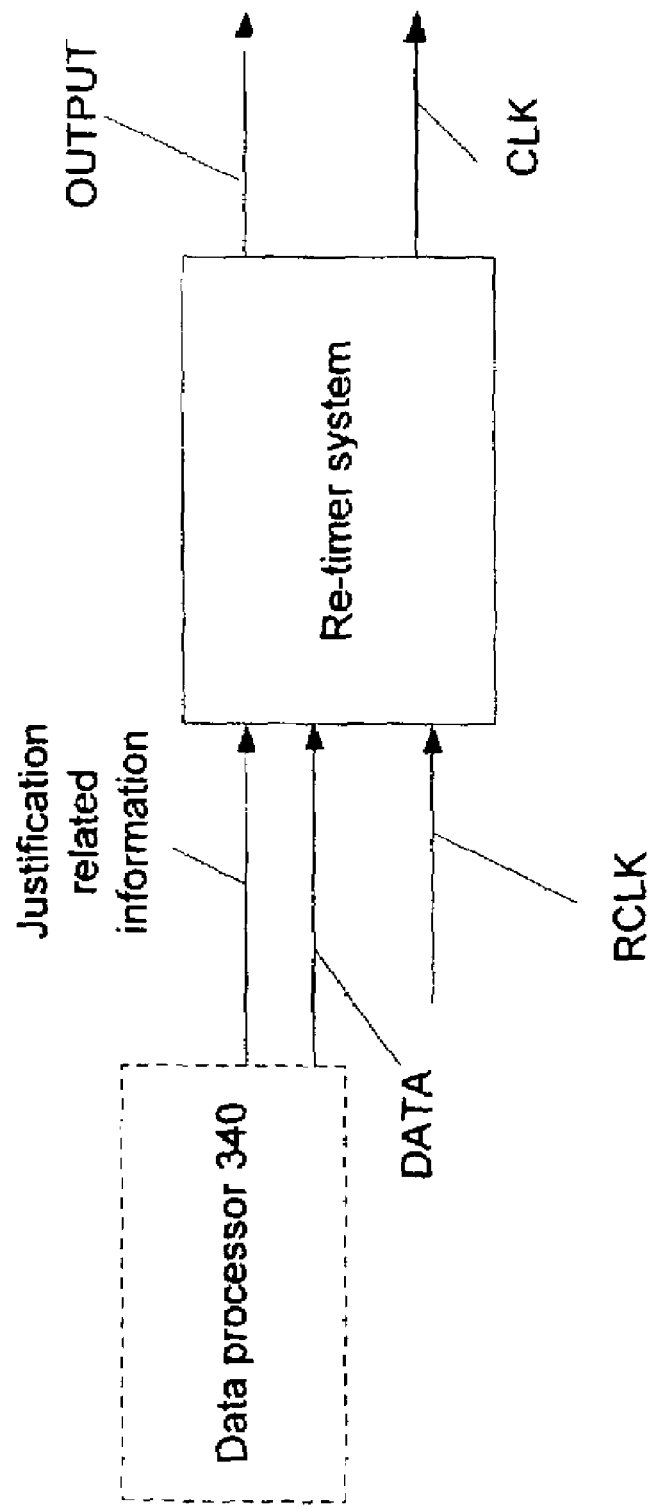
FIG. 4 depicts an example implementation of an embodiment of the present invention.

For example, some embodiments of the present invention may be used with layer two processor 340. For example, FIG. 4 depicts an example implementation of an embodiment of the present invention. The layer two processor 340 may extract justification related information and data signals from an optical channel payload unit (OPUk) (defined in G.709) of an OTN frame. Layer two processor 340 may provide justification related information and data signals (shown as DATA) to a re-timer system. In accordance with an embodiment of the present invention, in response to the receipt of justification related information, as well as signal DATA, the re-timer system may output data signals (shown as OUTPUT) at the proper frequencies, whether data signals were transmitted according to synchronous or asynchronous modes. Re-timer system may use a reference clock RCLK to generate signal OUTPUT. Re-timer system may further output a clock signal (shown as CLK) useful to regenerate data signals transmitted according to both synchronous and asynchronous modes.

Re-Timer System

Figure 5:
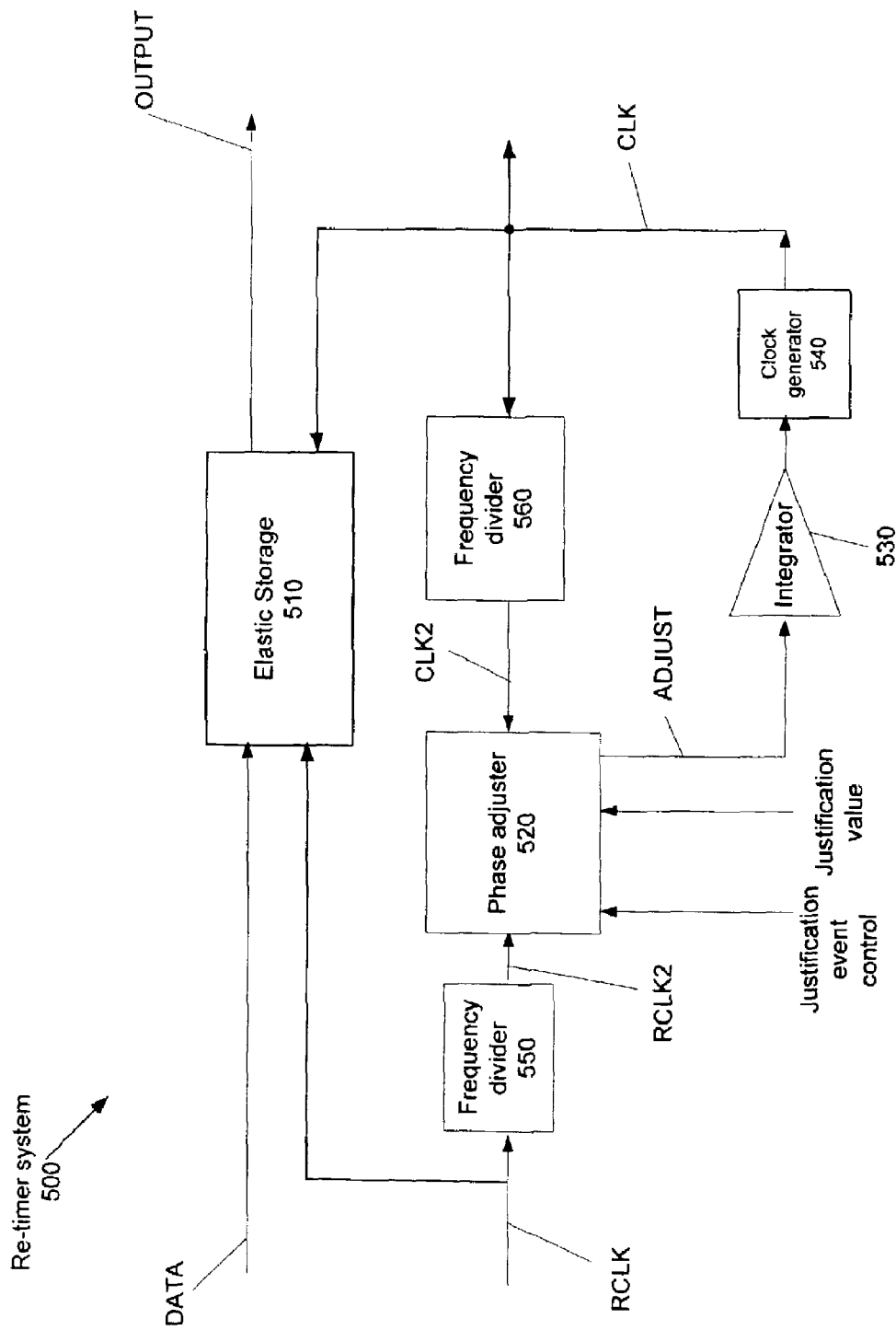
FIG. 5 depicts one possible implementation of a re-timer system, in accordance with an embodiment of the present invention.

FIG. 5 depicts one possible implementation of re-timer system 500 in accordance with an embodiment of the present invention. This embodiment of re-timer system 500 may include elastic storage 510, phase adjuster 520, integrator 530, clock generator 540, frequency divider 550 and frequency divider 560. Re-timer system 500 may receive a data signal (DATA), a reference clock signal (RCLK), and justification related information. Re-timer system 500 may derive a justification event control and justification values (positive or negative) from the justification related information in accordance with G.709. For example, the justification event control may correspond to the occurrence of a justification event and may be derived from the JC bytes in accordance with G.709. For example, the justification value may indicate whether positive or negative justification is to be applied by re-timer system 500. The justification value may be derived from the JC bytes in accordance with G.709. Re-timer system 500 may be implemented as any of or a combination of: hardwired logic, software stored by a memory device and executed by a microprocessor, firmware, an application specific integrated circuit (ASIC), and/or a field programmable gate array (FPGA).

Re-timer system 500 may output a data signal (shown as OUTPUT), derived from signal DATA, at the correct frequency, whether data was transmitted according to synchronous or asynchronous modes. Re-timer system 500 may generate a clock signal (shown as CLK) having a frequency useful to regenerate data at correct frequencies whether data was transmitted according to synchronous or asynchronous modes. To generate signals OUTPUT and CLK, re-timer system 500 may use justification event control and justification value signals.

Elastic storage 510 may receive signals CLK, DATA and RCLK. Elastic storage 510 may store data provided by signal DATA. Elastic storage 510 may output signal OUTPUT, derived from signal DATA, and timed according to signal CLK.

Clock generator 540 may generate a clock signal (shown as signal CLK) that may be used to regenerate data. Signal CLK may be used to establish the frequency at which data is regenerated for both synchronous and asynchronous modes of operation. Phase adjuster 520 may respond to justification related information by requesting clock generator 540 to adjust the speed of signal CLK. Clock generator 540 may provide signal CLK to elastic storage 510 and frequency divider 560. One suitable implementation of clock generator 540 may be a voltage-controlled crystal oscillator (VCXO), although, clock generator 540 may be implemented as another type of voltage controlled oscillator (LC-VCO, SAW-VCO, or other). For example, under one implementation of G.709, specifically for STM-64/OC-192, a frequency of signal CLK for synchronous operation may be approximately 622.080 MHz, a frequency of signal CLK for asynchronous operation may approximately range from 622.039 to 622.121 MHz.

Frequency divider 560 may receive signal CLK. Frequency divider 560 may divide the frequency of signal CLK by an integer. In one implementation of G.709, specifically for STM-64/OC-192, the integer may be 237, although the integer may vary depending on the relevant speed of data transmission. Frequency divider 560 may provide a frequency adjusted signal CLK (shown as CLK2) to phase adjuster 520.

Frequency divider 550 may receive signal RCLK. Frequency divider 550 may divide the frequency of signal RCLK by an integer. In one implementation of G.709, specifically for STM-64/OC-192, the integer may be 255, although the integer may vary depending on the relevant speed of data transmission. Frequency divider 550 may provide a frequency adjusted signal RCLK (shown as RCLK2) to phase adjuster 520.

Phase adjuster 520 may receive signal RCLK2 and signal CLK2 and may receive justification event control and justification values. Based upon justification event control and justification values, phase adjuster 520 may output signal ADJUST to instruct clock generator 540 to modify the speed of signal CLK. A positive justification value may correspond to signal ADJUST requesting clock generator 540 to phase shift signal CLK by a negative amount (which may correspond to one less data byte per OTN frame). Each negative justification value may correspond to signal ADJUST requesting clock generator 540 to phase shift signal CLK by a positive amount (which may correspond to one extra data byte per OTN frame). For example, with the example divider ratios mentioned with respect to frequency dividers 550 and 560, each positive justification value may correspond to phase shift of signal CLK by minus one-hundred-eighty-degrees (−180 degrees) whereas each negative justification value may correspond to phase shift of signal CLK by one-hundred-eighty-degrees (180 degrees).

Integrator 530 may receive signal ADJUST. Integrator 530 may accumulate the magnitudes of signal ADJUST and output a sum to the clock generator 540.

Phase Adjuster

Figure 6:
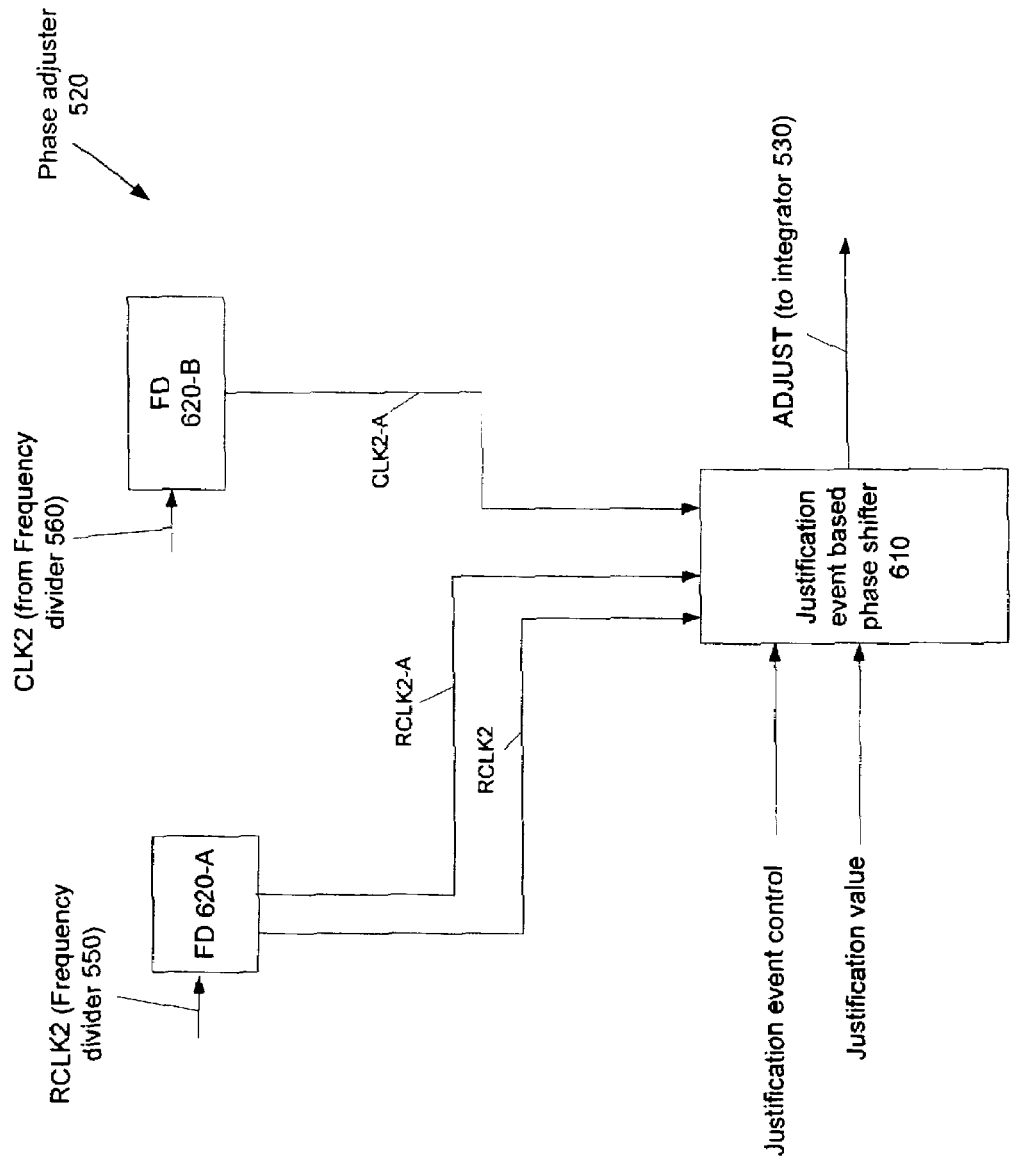
FIG. 6 depicts one possible implementation of a phase adjuster in accordance with an embodiment of the present invention.

FIG. 6 depicts one possible implementation of phase adjuster 520 in accordance with an embodiment of the present invention. Phase adjuster 520 may include justification event based phase shifter 610, and frequency dividers ("FD") 620-A and 620-B.

Frequency divider 620-A may receive signal RCLK2 from frequency divider 550. Frequency divider 620-A may output signal RCLK2 and a ninety (90) degree phase shifted version of signal RCLK2 (shown as RCLK2-A). In one implementation, signal RCLK2-A may have a frequency that is one-fourth the frequency of signal RCLK2. Frequency divider 620-A may provide the signals RCLK2 and RCLK2-A to justification event based phase shifter 610.

Frequency divider 620-B may receive signal CLK2 from frequency divider 560. In one implementation, frequency divider 620-B may divide the frequency of signal CLK2 by four (4). Frequency divider 620-B may provide a frequency divided version of signal CLK2 (signal CLK2-A) to justification event based phase shifter 610.

Justification event based phase shifter 610 may output signal ADJUST based upon signals RCLK2, RCLK2-A, CLK2-A, justification control event and justification value signals. Each positive justification value may correspond to signal ADJUST requesting clock generator 540 to phase shift signal CLK by a negative amount corresponding to one data byte less per frame. Each negative justification value may correspond to signal ADJUST requesting clock generator 540 to phase shift signal CLK by a positive amount.

Figure 7:
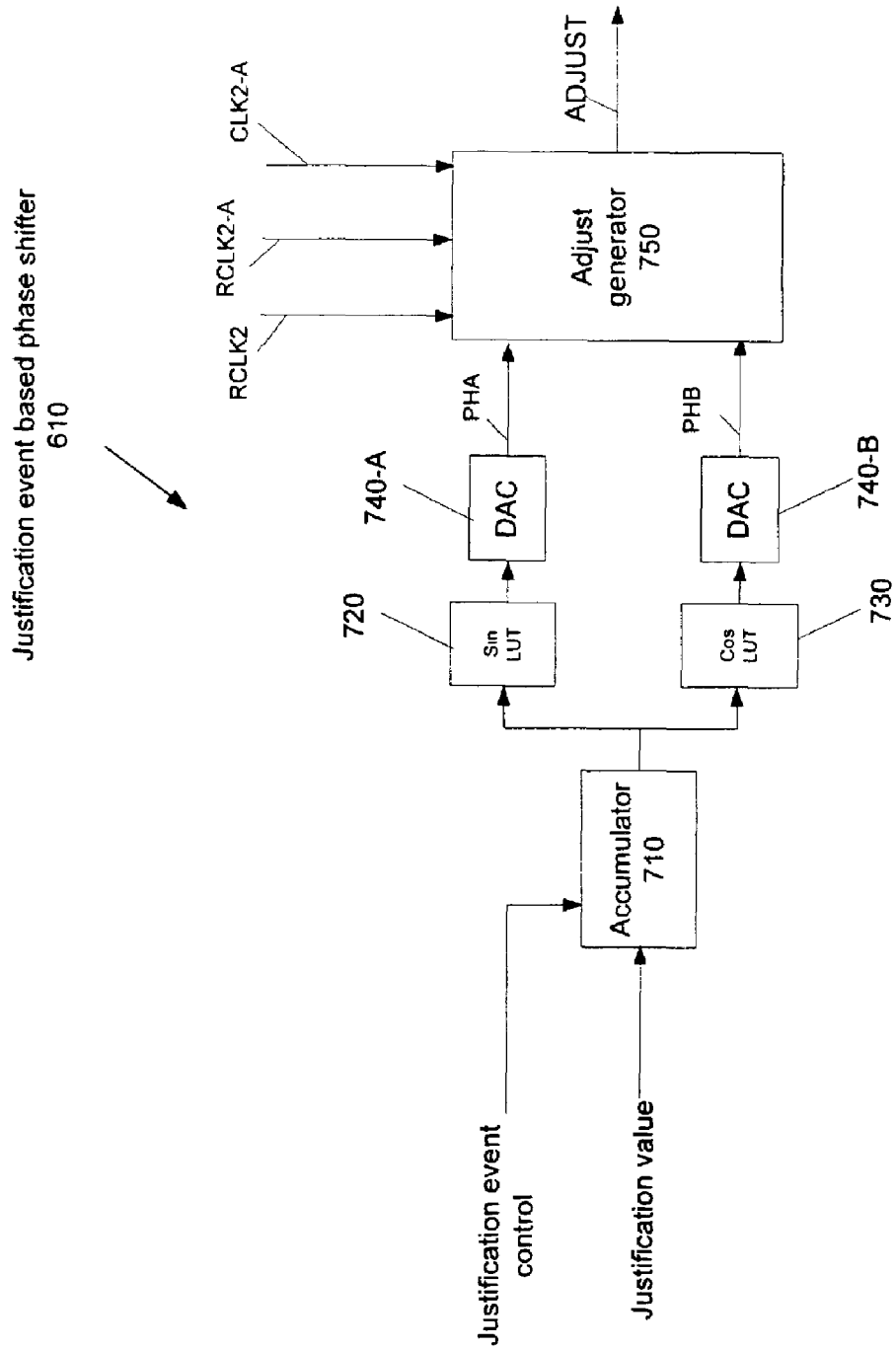
FIG. 7 depicts one possible implementation of a justification event based phase shifter in accordance with an embodiment of the present invention.

FIG. 7 depicts one possible implementation of justification event based phase shifter 610 in accordance with an embodiment of the present invention. Justification event based phase shifter 610 may include accumulator 710, sine value look-up-table ("LUT") 720, cosine value LUT 730, digital-to-analog converter ("DAC") 740-A, DAC 740-B, and adjust generator 750. Accumulator 710 may receive the following signals: (1) justification event control and (2) justification values. Accumulator 710 may sum the zero, positive, and negative justification values. Accumulator 710 may output the sum to both sin LUT 720 and cos LUT 730. The sum stored by accumulator 710 may be represented by A modulo M, where A is the arithmetic sum of justification values and where M may be 8N, although other values of M may be used. In one implementation of G.709, the value of N may be 237, although other values of N may be used.

In response to the justification value sum provided by the accumulator 710, sin LUT 720 and cos LUT 730 may retrieve and output specific phase related amplitudes of respective sine and cosine signals. An incremental increase in the justification value sum may correspond to a phase step decrease of $2\pi/M$ radians for sine and cosine signals. An incremental decrease in the justification value sum may correspond to a phase step increase of $2\pi/M$ radians for sine and cosine signals.

Sin LUT 720 and cos LUT 730 may be implemented as programmable storage devices such as read-only memory ("ROM") or random-access memory ("RAM") devices. Sin LUT 720 and cos LUT 730 may output amplitudes of sine and cosine signals to respective DACs 740-A and 740-B. DACs 740-A and 740-B may receive amplitude values of sine and cosine signals. DACs 740-A and 740-B may output analog sine and cosine signals (shown as respective signals PHA and PHB) to adjust generator 750. For example, the frequency of signals PHA and PHB may be represented as $2\pi*\text{sum}/M$, where variable M is 8*237 and variable "sum" may be the sum of justification values from the accumulator 710, although other values of M may be used.

Figure 8:
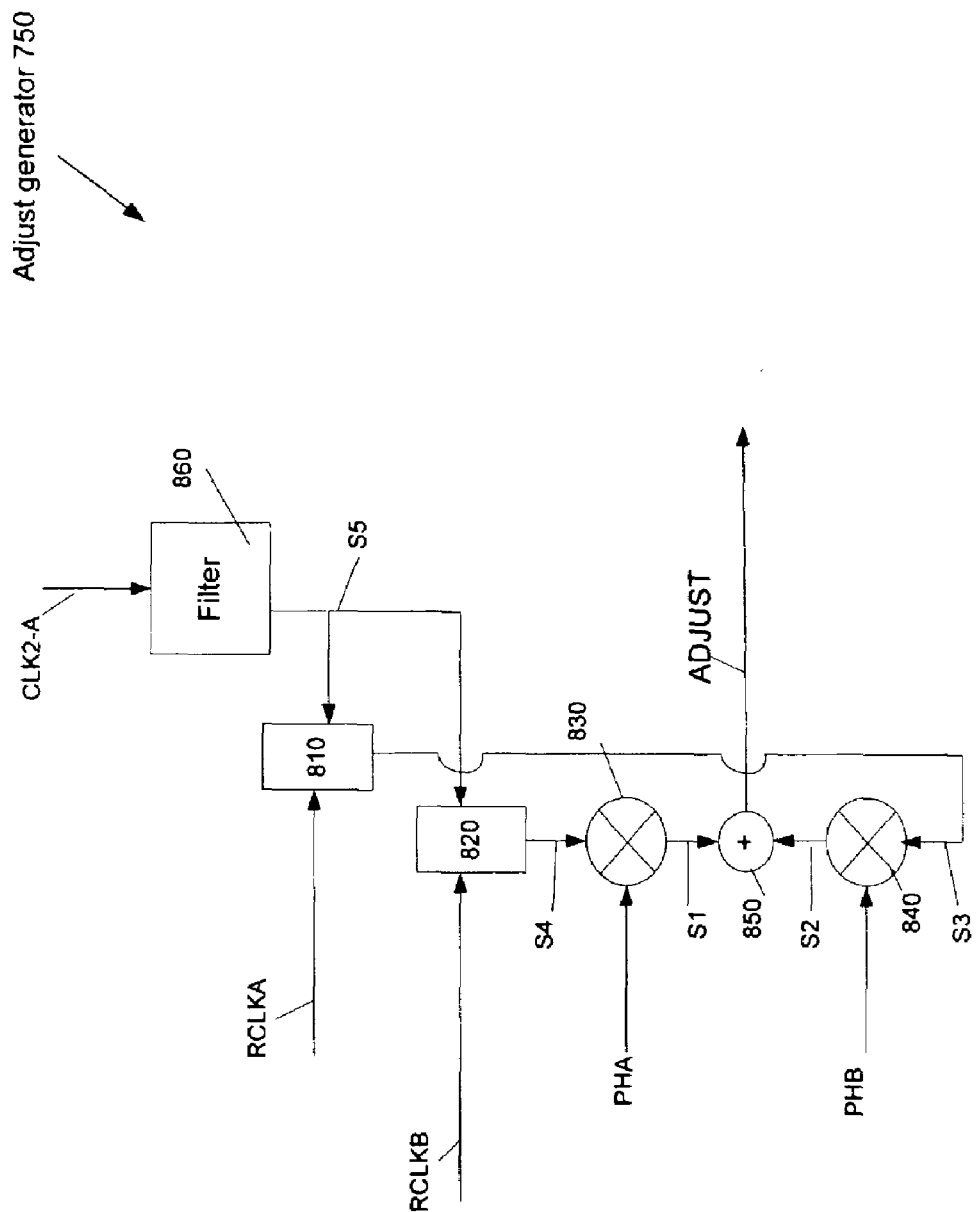
FIG. 8 depicts one possible implementation of an adjust generator in accordance with an embodiment of the present invention.

Adjust generator 750 may receive signals PHA and PHB. Adjust generator 750 may output a signal ADJUST to adjust the phase of signal CLK in response to receipt of signals PHA and PHB. One advantage of phase adjuster 520 may be that it may adjust the phase of signal CLK over an unlimited angular range and instantaneously respond to justification values. FIG. 8 depicts one possible implementation of adjust generator 750. Adjust generator 750 may include computation elements 810 and 820, multipliers 830 and 840, adder 850, and filter 860. Signal ADJUST may be represented by the following relationship:

$$\text{signal ADJUST} = \sin(Z - Y + X),$$

where
X represents the frequency of signals RCLKA and RCLKB,
Y represents the frequency of signal CLK2-A, and
Z represents the frequency/phase of signals PHA and PHB.

In one implementation, adder 850 may generate signal ADJUST by summing signals S1 and S2. Signals S1 and S2 may be represented by the following relationships:

$$S1 = PHA * S4$$

$$S2 = PHB * S3.$$

For example, signal S3 may be represented by $\sin(X-Y)$ and signal S4 may be represented by $\cos(X-Y)$. Multiplier 830 may multiply signals PHA and S4 and output the product as signal S1. Similarly, multiplier 840 may multiply signals PHB and S3 and output the product as signal S2. Computation element 810 may output signal S3. Computation element 810 may generate signal S3 by multiplying signals RCLKA and S5 and then filtering from the product signals having frequencies other than approximately X−Y. Computation element 820 may output signal S4. Computation element 820 may generate signal S4 by multiplying signals RCLKB and S5 and then filtering from the product signals having frequencies approximately other than approximately X−Y. Filter 860 may output signal S5. Filter 860 may receive signal CLK2-A from frequency divider 620-B. Filter 860 may be implemented as a band pass filter that may filter out signals having frequencies approximately equal to 2*Y. Signal S5 may be represented as $2*\cos(Y)$.

Figure 9:
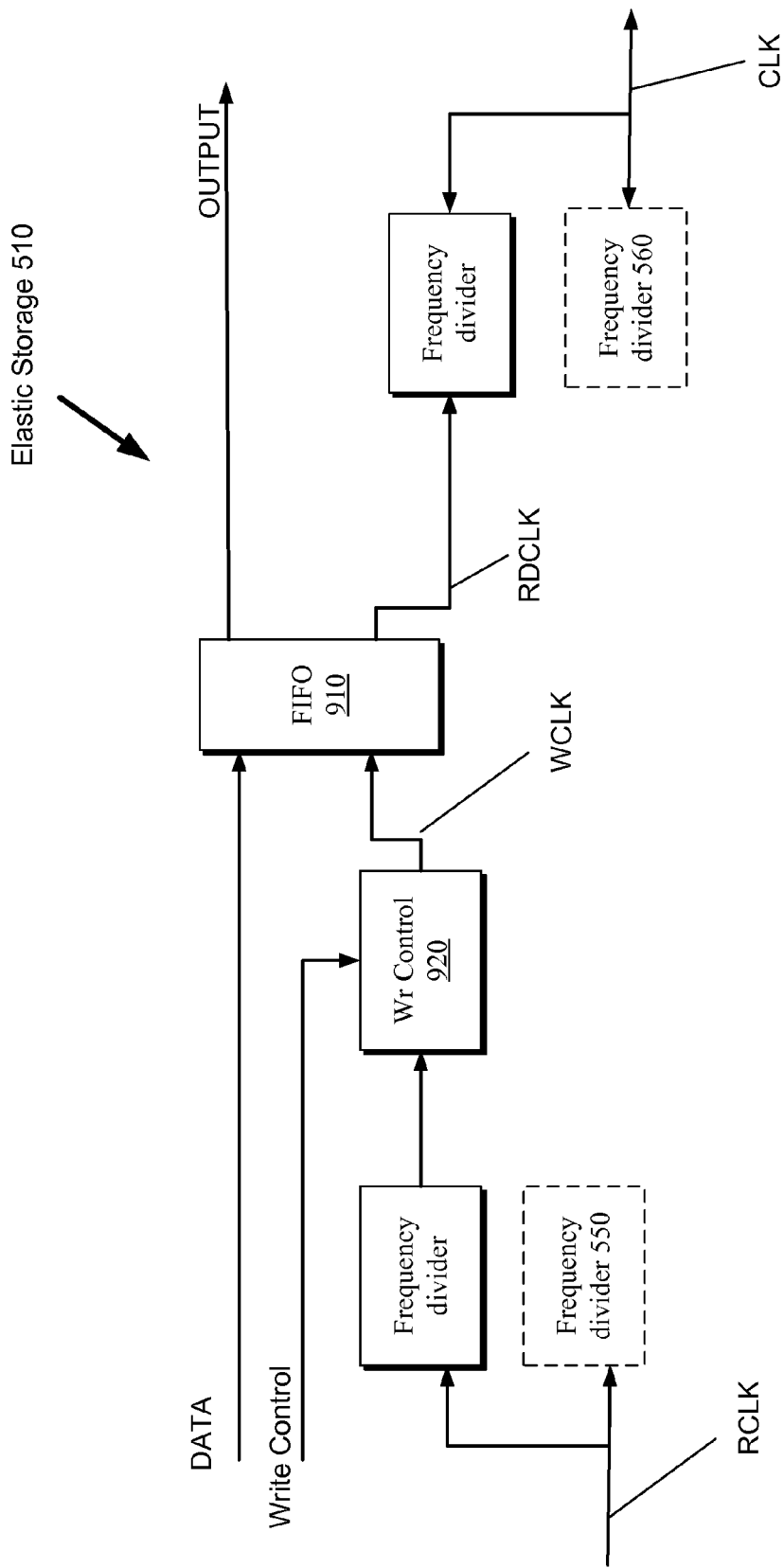
FIG. 9 depicts one possible implementation of an elastic storage in accordance with an embodiment of the present invention.

FIG. 9 depicts one possible implementation of elastic storage 510 in accordance with an embodiment of the present invention. Elastic storage 510 may include a first-in-first-out (FIFO) storage device 910 and a write control device 920. FIFO 910 may store data received from signal DATA according to transitions of a write clock (shown as WCLK). FIFO 910 may output data (shown as OUTPUT) according to transitions of a read clock (shown as RDCLK). When data is transmitted using an STM-64/OC-192 payload, signal RDCLK may have a frequency of approximately ⅛ of signal CLK, but other values of RDCLK may be used. One implementation of elastic storage 510 may use a write control device 920 to gate when FIFO 910 reads data from signal DATA. When signal DATA is transmitted by an STM64/OC-192 payload, write control device 920 may receive a version of signal WCLK that is frequency adjusted by, for example, ⅛, but other values of WCLK may be used. Signals DATA and OUTPUT may be 128 parallel bit signals but other numbers of bits may be used.

The drawings and the forgoing description gave examples of the present invention. The scope of the present invention, however, is by no means limited by these specific examples.

Numerous variations, whether explicitly given in the specification or not, such as differences in structure, dimension, and use of material, are possible. The scope of the invention is at least as broad as given by the following claims.

What is claimed is:

1. A method comprising:
   storing information provided in a first signal based on a reference clock signal;
   adjusting a phase of a clock signal based upon justification event information; and
   providing a second signal based upon the clock signal having adjusted phase independent of whether the first signal is provided in synchronous modes, wherein the second signal includes stored information,
   wherein the justification event information comprises justification event and justification values and wherein the adjusting the phase of the clock signal comprises:
   selectively summing justification values in response to the justification event being in an active state;
   adjusting the phase of the clock signal based upon the sum, wherein the adjusting the phase comprises:
   providing sine and cosine signals based upon the sum;
   summing the sine and cosine signals; and
   adjusting the phase of the clock signal based upon the sum of sine and cosine signals.

2. The method of claim 1, wherein the providing the sine and cosine signals comprises:
   for an increase in the sum of justification values, selectively decreasing phases of the sine and cosine signals by $2*\Pi/(8*N)$ radians, where N is an integer.

3. The method of claim 1, wherein the providing the sine and cosine signals comprises:
   for a decrease in the sum of justification values, selectively increasing phases of the sine and cosine signals by $2*\Pi/(8*N)$ radians, where N is an integer.

4. The method of claim 1, wherein the sum of justification values resets after the count of X, where X is an integer.

5. The method of claim 1, wherein the adjusting the phase further comprises:
   adjusting the phase of the clock signal based upon the sum of sine and cosine signals as well as the reference clock signal.

6. The method of claim 1, further comprising selectively not adjusting the phase of the clock signal in response to the justification event information indicating no justification is present.

7. An apparatus comprising:
   a clock generator to generate a clock signal;
   a phase adjuster to provide a phase adjust signal to adjust a phase of the clock signal based upon justification event information;
   a storage device to store information from a first signal based on a reference clock signal, wherein the storage device is to provide information from the first signal based upon the clock signal independent of whether the first signal is provided in synchronous or asynchronous modes; and
   an integrator to instruct the clock generator to adjust a phase of the clock signal based upon the phase adjust signal;
   wherein the justification event information comprises justification event and justification values and wherein the phase adjuster comprises:
   an accumulator to selectively sum justification values in response to the justification event being in an active state;
   a sine look-up-table to provide a sine signal based upon the sum;
   a cosine look-up-table to provide a cosine signal based upon the sum; and
   an adjust generator to provide the phase adjust signal based upon the sine and cosine signals.

8. The apparatus of claim 7, wherein the adjust generator comprises logic to provide the phase adjust signal based upon the sine and cosine signals, the reference clock signal, and the clock signal.

9. The apparatus of claim 7, wherein the elastic storage comprises:
   a storage device to store information in the first signal based upon the reference clock signal and to provide stored information based upon the clock signal.

10. A system comprising:
    an amplifier to receive a first signal and to amplify the first signal;
    a layer two processor to receive the first signal and to extract justification related information from the first signal; and
    a re-timer system comprising:
    logic to store information from the first signal based on a reference clock signal;
    logic to provide and adjust a clock signal based upon the justification related information; and
    logic to provide a second signal based upon the clock signal and independent of whether the first signal is provided in synchronous or asynchronous modes, wherein the second signal includes information provided by the first signal,
    wherein the justification related information comprises justification event and justification values and wherein the logic to provide and adjust the clock signal comprises:
    logic to selectively sum justification values in response to the justification event being in an active state;
    a sine look-up-table to provide a sine signal based upon the sum;
    a cosine look-up-table to provide a cosine signal based upon the sum; and
    logic to provide the phase adjust signal based upon the sine and cosine signals.

11. The system of claim 10, further comprising:
    an optical-to-electrical converter to convert an optical signal into an electrical signal and to provide the electrical signal to the amplifier as the first signal.

12. The system of claim 10, wherein the layer two processor comprises logic to perform media access control in compliance with IEEE 802.3.

13. The system of claim 10, wherein the layer two processor comprises logic to perform optical transport network de-framing in compliance with ITU-T G.709.

14. The system of claim 10, wherein the layer two processor comprises logic to perform optical transport network de-wrapping in compliance with ITU-T G.709.

15. The system of claim 10, wherein the layer two processor comprises logic to perform forward error correction processing in compliance with ITU-T G.975.

16. The system of claim 10, further comprising a bus to receive signals from the layer two processor and to provide signals to the layer two processor.

17. The system of claim 16, further comprising a switch fabric coupled to the bus.

18. The system of claim 16, further comprising a packet processor coupled to the bus.

* * * * *